United States Patent
Serlie et al.

(10) Patent No.: US 9,697,598 B2
(45) Date of Patent: Jul. 4, 2017

(54) GENERATING A KEY-IMAGE FROM A MEDICAL IMAGE

(71) Applicant: KONINKLIJKE PHILIPS N.V., Eindhoven (NL)

(72) Inventors: Iwo Willem Oscar Serlie, Best (NL); Zarko Aleksovski, Eindhoven (NL); Rudolph Martherus, Vlissingen (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/437,839

(22) PCT Filed: Nov. 12, 2013

(86) PCT No.: PCT/IB2013/060074
§ 371 (c)(1),
(2) Date: Apr. 23, 2015

(87) PCT Pub. No.: WO2014/080314
PCT Pub. Date: May 30, 2014

(65) Prior Publication Data
US 2015/0302580 A1    Oct. 22, 2015

(30) Foreign Application Priority Data
Nov. 23, 2012   (EP) .................................. 12194038

(51) Int. Cl.
*G06K 9/00* (2006.01)
*G06K 9/20* (2006.01)
(Continued)

(52) U.S. Cl.
CPC .............. *G06T 7/0012* (2013.01); *G06T 7/11* (2017.01); *G06T 7/194* (2017.01); *G06T 11/60* (2013.01);
(Continued)

(58) Field of Classification Search
None
See application file for complete search history.

(56) References Cited

U.S. PATENT DOCUMENTS

| 9,370,305 B2 | 6/2016 | Qian et al. |
| 2002/0089516 A1 | 7/2002 | Sobol |

(Continued)

FOREIGN PATENT DOCUMENTS

NL  WO 2012123829 A1 * 9/2012 ........... G06F 19/321

OTHER PUBLICATIONS

Akgul, C.B. et al., "Content-based image retrieval in radiology: current status and future directions", Journal of Digital Imaging, vol. 24, No. 2 (Apr. 2011): pp. 208-222.

(Continued)

*Primary Examiner* — Sean Conner

(57) ABSTRACT

A system (100) for generating a key-image from a medical image, the key-image comprising an image area selected from the medical image, the system comprising: —an image analyzer (140) for: i) detecting a lesion (300) in the medical image; ii) based on anatomical information, identifying an anatomical landmark (310) which has an anatomical relation with the lesion; and iii) detecting the anatomical landmark in the medical image; and —a key-image generator (160) for j) selecting an image area (400) in the medical image which comprises the lesion (300) and the anatomical landmark (310), and jj) generating the key-image (162) so as to comprise said image area.

15 Claims, 5 Drawing Sheets

(51) Int. Cl.
  *G06T 7/00* (2017.01)
  *G06T 11/60* (2006.01)
  *G06T 7/11* (2017.01)
  *G06T 7/194* (2017.01)

(52) U.S. Cl.
  CPC .............. *G06T 2207/10016* (2013.01); *G06T 2207/10072* (2013.01); *G06T 2207/30004* (2013.01)

(56) References Cited

U.S. PATENT DOCUMENTS

| | | |
|---|---|---|
| 2004/0147830 A1 | 7/2004 | Parker et al. |
| 2005/0129297 A1 | 6/2005 | Kamath et al. |
| 2007/0012202 A1 | 1/2007 | Byrne |
| 2009/0208118 A1 | 8/2009 | Csurka |
| 2010/0150417 A1* | 6/2010 | Kshirsagar ............... G06K 9/72 382/128 |
| 2011/0028825 A1 | 2/2011 | Douglas et al. |
| 2011/0075913 A1 | 3/2011 | Moriya |
| 2011/0128289 A1* | 6/2011 | Zingaretti ............. G06T 7/0014 345/428 |
| 2012/0155734 A1* | 6/2012 | Barratt .................. G06T 7/0032 382/131 |
| 2013/0109915 A1 | 5/2013 | Krupnik et al. |
| 2013/0290006 A1* | 10/2013 | Kamath ................ G06F 19/345 705/2 |
| 2014/0003697 A1* | 1/2014 | Qian .................... G06F 19/321 382/131 |

OTHER PUBLICATIONS

Moise, A, "Designing better user interfaces for radiology interpretation", Thesis in School of Computing Science, Simon Fraser University, 2003.

He. C. et al., "Automatic Extraction of ROI in Medical Image", School of Electronic Information, Wuhan University, China, 2004.

* cited by examiner

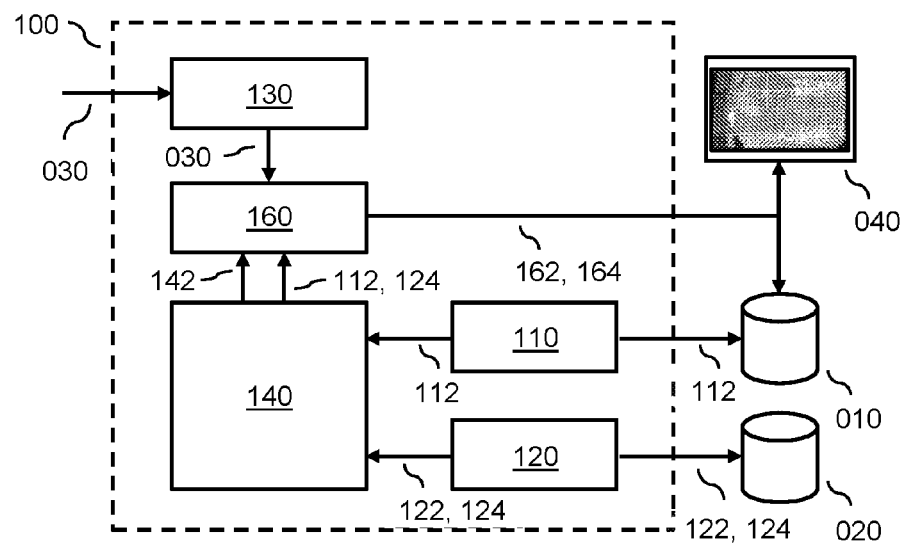
Fig. 1
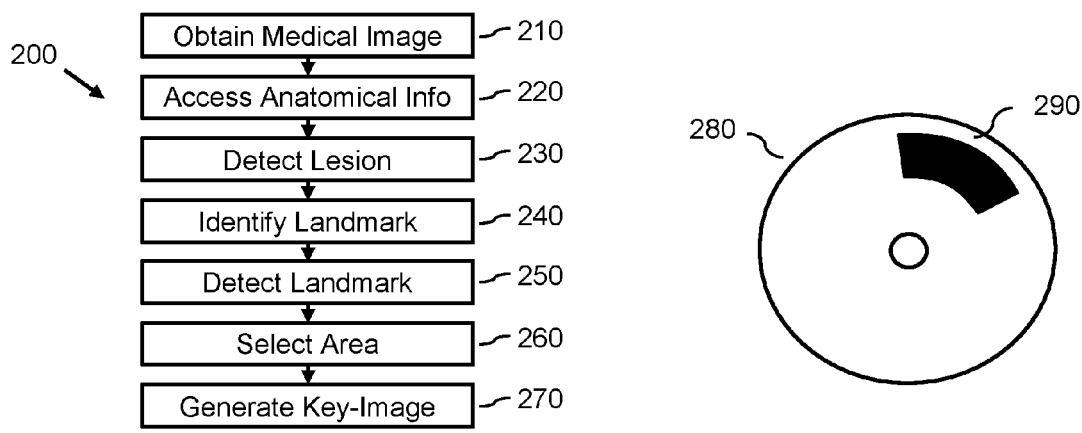
Fig. 2
Fig. 3

GENERATING A KEY-IMAGE FROM A MEDICAL IMAGE

CROSS-REFERENCE TO PRIOR APPLICATIONS

This application is the U.S. National Phase application under 35 U.S.C. §371 of International Application No. PCT/IB2013/060074, filed on Nov. 12, 2013, which claims the benefit of European Patent Application No. 12194038.1, filed on Nov. 23, 2012. These applications are hereby incorporated by reference herein.

FIELD OF THE INVENTION

The invention relates to a system and a method for generating a key-image from a medical image, the key-image comprising an image area selected from the medical image. The invention further relates to a workstation and an imaging apparatus comprising said system, and to a computer program product comprising instructions for causing a processor system to perform said method.

BACKGROUND OF THE INVENTION

Medical images are frequently used for diagnostic purposes. To ensure a reliability of such diagnosis, the medical images are typically of high quality and subjected to little or no image manipulation. Nevertheless, there is a need for using medical images for illustration purposes rather than diagnostic purposes. For example, in a radiology report, a radiologist may report on a lesion which was detected based on the medical image, yet may wish to include a more illustrative view of the lesion in the radiology report.

For that purpose, a user, such as the radiologist or other clinician, may use a workstation or similar system to manually manipulate the medical image in order to obtain a suitable view of the lesion. This may involve the user selecting an image area for viewing by zooming and/or panning towards the lesion in the medical image. Optionally, the user may adjust viewing parameters such as window widthlevel to improve viewing conditions.

Having obtained a suitable view, the user may then request the workstation to generate an image of the current view, which may then be included in the radiology report. An image showing a selected area of the medical image is also referred to as a key-image. It is thus known to manually select an image area for generating a key-image.

SUMMARY OF THE INVENTION

It would be advantageous to provide a system or method which enables automatic generation of a key-image from a medical image.

To better address this concern, a first aspect of the invention provides a system generating a key-image from a medical image, the key-image comprising an image area selected from the medical image, the system comprising:
    an image interface for obtaining the medical image and metadata indicative of a content of the medical image;
    a database interface for accessing anatomical information on a medical database, the anatomical information being indicative of anatomical landmarks associated with the content of the medical image;
    an image analyzer for:
        i) detecting a lesion in the medical image;
        ii) based on the anatomical information, identifying an anatomical landmark which has an anatomical relation with the lesion; and
        iii) detecting the anatomical landmark in the medical image; and
    a key-image generator for j) selecting an image area in the medical image which comprises the lesion and the anatomical landmark, and jj) generating the key-image so as to comprise said image area.

In a further aspect of the invention, a workstation and imaging apparatus is provided comprising the system set forth.

In a further aspect of the invention, a method is provided for generating a key-image from a medical image, the key-image comprising an image area selected from the medical image, the method comprising:
    obtaining the medical image and metadata indicative of a content of the medical image;
    accessing anatomical information on a medical database, the anatomical information being indicative of anatomical landmarks associated with the content of the medical image;
    detecting a lesion in the medical image;
    based on the anatomical information, identifying an anatomical landmark which has an anatomical relation with the lesion;
    detecting the anatomical landmark in the medical image;
    selecting an image area in the medical image which comprises the lesion and the anatomical landmark; and
    generating the key-image so as to comprise said image area.

In a further aspect of the invention, a computer program product is provided comprising instructions for causing a processor system to perform the method set forth.

The aforementioned measures provide an image interface which obtains the medical image, e.g., from an internal or external storage medium. The image interface further obtains metadata indicative of a content of the medical image. The metadata may be comprised in the medical image, e.g., in the form of header information. A database interface is provided which is able to access a medical database. The medical database comprises computer readable anatomical information. The anatomical information is indicative of anatomical landmarks associated with the content of the medical image. For example, in case the content of the medical image is a patient's liver, the anatomical information may be information from a section of medical textbook which is related to the liver.

Furthermore, an image analyzer is provided. The image analyzer is arranged for detecting a lesion in the medical image, e.g., using a lesion detection technique as known per se from the field of medical image analysis. It is noted that the term lesion refers to a localized abnormal structural change, e.g., a tissue growth, a fracture, etc. The image analyzer is further arranged for consulting the medical database to identify an anatomical landmark. An anatomical landmark is a particularly relevant part of the anatomy during medical interpretation. The image analyzer identifies an anatomical landmark which has an anatomical relation with the lesion. For that purpose, image analyzer uses the anatomical information, e.g., by determining whether an anatomical relation between the anatomical landmark and the lesion is described in or suggested by the anatomical information. The anatomical relation may be a spatial relation, e.g., a connectedness or vicinity. The image analyzer detects said anatomical landmark in the medical image. Furthermore, a key-image generator is provided which selects an image area which encompasses both the lesion and the anatomical landmark. The image area is then used to generate the key-image.

The above measures have the effect that a key-image is obtained which comprises, next to the lesion itself, also an anatomical landmark, and in particular, an anatomical landmark which has an anatomical relation with the lesion according to the anatomical information in the medical database. As such, a viewer of the key-image is not only provided with the lesion itself but also with an anatomical landmark which has an anatomical relation with the lesion, thereby providing an anatomical context for the lesion. Advantageously, a more informative key-image is obtained compared to a key-image which comprises solely the lesion. Advantageously, the key-image is better suited for communicating results of the medical interpretation of the medical image than the medical image itself or said key-image solely of the lesion, e.g., in the form of a radiology report.

Optionally, the lesion is at least partly comprised in an anatomical structure, and the image analyzer is arranged for detecting the anatomical structure in the medical image, and identifying the anatomical landmark from the anatomical structure. The anatomical structure has a clear anatomical relation with the lesion since it at least partly comprises the lesion. As such, the anatomical structure is typically of relevance for the interpretation of the lesion. By identifying the anatomical landmark from said anatomical structure, i.e., by identifying an anatomical landmark which is part of the anatomical structure, an anatomical landmark is identified which is typically of relevance for the interpretation of the lesion. Advantageously, a more informative key-image is obtained.

Optionally, the anatomical landmark comprises an edge of the anatomical structure. The edge of the anatomical structure provides a clear anatomical context.

Optionally, the anatomical information enables a medical interpretation of the lesion, and the image analyzer is arranged for identifying the anatomical landmark based on an estimated relevance of the anatomical relation in the medical interpretation of the lesion. The anatomical information enables a user to interpret the content of the medical image. For example, the anatomical information may be from a medical guideline or from a medical textbook. Typically, in such interpretation, anatomical relationships play an important role. By estimating a relevance of the anatomical relation in said interpretation of the lesion, the image analyzer can identify an anatomical landmark which is of relevance for the user, e.g., provides suitable anatomical context. Advantageously, the image analyzer identifies an anatomical landmark which is most relevant for the interpretation of the lesion.

Optionally, the image analyzer is arranged for identifying the anatomical landmark based on an estimated distance to the lesion. The distance between the lesion and the anatomical landmark typically correlates with an anatomical relation, i.e., nearby anatomical landmarks are typically anatomically closer related to the lesion than those far away. By estimating said distance, the image analyzer can easily identify potentially relevant anatomical landmarks in the anatomical information. For example, the image analyzer may identify an anatomical landmark which is close or closest to the lesion.

Optionally, the system further comprises a user interface subsystem for enabling a user to adjust the image area before the key-image is generated. Hence, the user can refine and/or adjust to preference the initial automatic selection of the image area.

Optionally, the key-image generator is arranged for selecting the image area by establishing a bounding box in the medical image which encompasses the lesion and the anatomical landmark. A bounding box is well suited for selecting the image area since it yields a rectangular image area which can be used to generate a rectangular key-image.

Optionally, the key-image generator is arranged for maintaining an aspect ratio of the bounding box over a number of medical images. Key-images having a same aspect ratio allow easier comparison. Advantageously, it is easier to include such key-images into a radiology report, e.g., by providing a fixed place holder. Advantageously, the ratio of the bounding box is maintained even when enabling the user to adjust the image area.

Optionally, the key-image generator is arranged for adjusting a window level and/or window width of the key-image. The key-image is thus automatically post-processed by adjusting the window level and/or the window width of the key-image. Advantageously, the window level and/or the window width are adjusted for optimal viewing of the lesion.

Optionally, the medical database comprises a textbook view of the content of the medical image, and the system is arranged for generating a further key-image from the textbook view which comprises the anatomical landmark and a location corresponding to the lesion. A textbook view is well suited for providing an anatomical context of the lesion since it typically provides a more illustrative view of the anatomical context, e.g., by showing an outline of the anatomy instead of a photo-like image. Here, the term view refers to a visual representation such as an image, a graphic, etc. By generating a further key-image which shows the location of the lesion, i.e., the anatomical structure there, and the anatomical landmark, the user is provided with a better illustration of the lesion than only the key-image itself. Advantageously, the combination of key-image and further key-image is well suited for educational purposes and/or for non-medically educated individuals.

Optionally, the system further comprises annotation means for enabling a user to include an annotation in the key-image, and the system is arranged for including the annotation at a corresponding location in the further key-image. The user can thus annotate the key-image, with the annotation being automatically mirrored in the further key-image.

Optionally, the system is further arranged for registering the textbook view towards the medical image before generating the further key-image. Hence, the textbook view is transformed to look more like the medical image. Advantageously, it is easier for the user to see the correspondence between the key-image and the further key-image.

Optionally, the textbook view is associated with an anatomical model, and the registering is based on a model fitting of the anatomical model to the medical image.

Optionally, the database interface is arranged for selecting the anatomical information within the medical database based on a type of patient and/or a type of user. The type of patient may be identified by the metadata of the image. The type of patient may relate to an age of the patient, e.g., a child, adult or senior. The type of user may be identified in various known ways to the system, e.g., using a user profile. The type of user may indicate a field of expertise, e.g., a neurosurgeon, orthopedic surgeon, etc. Additionally or alternatively, the type of user may indicate level of expertise, e.g., expert or non-expert user. The database interface may thus access anatomical information which is relevant for the patient and/or the user. For example, if the patient is a child, the database interface may select anatomical information which contains anatomical landmarks of the content of the medical image which are relevant for children. Advantageously, the anatomical landmark identified by the image analyzer is more relevant for the type of patient and/or the type of user.

Optionally, the key-image generator further generates metadata which identifies the lesion and/or the anatomical landmark. The metadata may be included in the key-image, e.g., in the form of header information. Advantageously, when viewing or otherwise using the key-image, the lesion and/or the anatomical landmark may be used to steer navigation, e.g., to determine an axis of rotation if the key-image is a 3D key-image.

Optionally, the key-image generator further generates metadata which includes a hyperlink to an associated image. The associated image may be the medical image itself. The associated image may also be another key-image which is associated with the key-image, e.g., by being of the same patient but being generated earlier in time.

Optionally, an annotation system is provided comprising an image interface for obtaining a medical image and metadata indicative of a content of the medical image; a database interface for accessing a medical database, comprising a textbook view of the content of the medical image; an image processor for generating a textbook image of the textbook view for simultaneous presentation with the medical image; annotation means for enabling a user to include an annotation in the medical image; wherein the image processor is arranged for including the annotation at a corresponding location in the textbook image. Optionally, the image processor of the annotation system is arranged for registering the textbook view towards the medical image before generating the textbook image. Optionally, the textbook view is associated with an anatomical model, and the registering is based on a model fitting of the anatomical model to the medical image.

It will be appreciated by those skilled in the art that two or more of the above-mentioned embodiments, implementations, and/or aspects of the invention may be combined in any way deemed useful.

Modifications and variations of the workstation, the imaging apparatus, the method, and/or the computer program product, which correspond to the described modifications and variations of the system, can be carried out by a person skilled in the art on the basis of the present description.

A person skilled in the art will appreciate that the method may be applied to multi-dimensional image data, e.g. to two-dimensional (2-D), three-dimensional (3-D) or four-dimensional (4-D) images. A dimension of the multi-dimensional image data may relate to time. For example, a three-dimensional image may comprise a time domain series of two-dimensional images. As a result, if the medical image is, e.g., a 3-D medical image, the image area selected by the key-image generator may be a 3-D image area and the key-image may be a 3-D key-image, i.e., a key-image volume or in short a key-volume.

The image may be acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

The invention is defined in the independent claims. Advantageous yet optional embodiments are defined in the dependent claims.

BRIEF DESCRIPTION OF THE DRAWINGS

These and other aspects of the invention are apparent from and will be elucidated with reference to the embodiments described hereinafter. In the drawings, FIG. 1 shows a system for generating a key-image from a medical image;

FIG. 2 shows a method for generating a key-image from a medical image;

FIG. 3 shows a computer program product for performing the method;

Figure 4A:
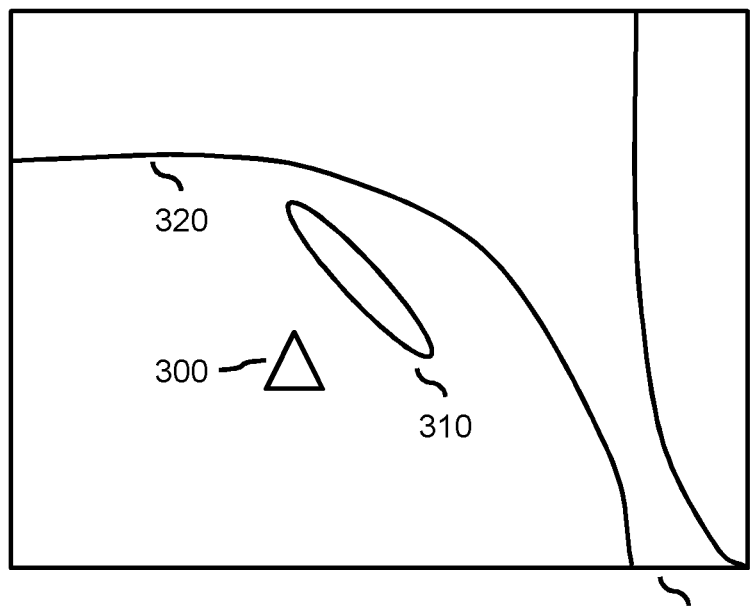
FIG. 4a shows a medical image comprising a lesion, an anatomical landmark nearby the lesion, and an anatomical structure in which the lesion is comprised.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EMBODIMENTS

FIG. 1 shows a system 100 for generating a key-image from a medical image. The system 100 comprises an image interface 110 for obtaining the medical image 112 and metadata indicative of a content of the medical image. In the example of FIG. 1, the metadata is comprised in the medical image 112, e.g., in the form of header information, and is thus not separately shown. Alternatively, the metadata may be received in separation of the medical image 112. FIG. 1 shows the image interface 110 obtaining the medical image 112 from an external image database 010. Although not shown in FIG. 1, the image database 010 may also be a part of the system 100. The image database 010 may be constituted by, e.g., a Picture Archiving and Communication System (PACS). The system 100 further comprises a database interface 120 for accessing a medical database 020. The medical database 020 is also shown to be an external database but may equally be part of the system 100. The medical database 020 comprises anatomical information 122 which is indicative of anatomical landmarks associated with the content of the medical image. The database interface 120 may make use of the metadata to determine which anatomical information 122 to access.

The system 100 further comprises an image analyzer 140 arranged for detecting a lesion comprised in the medical image 112. For that purpose, the image analyzer 140 is shown to receive the medical image 112 from the image interface 110. The image analyzer 140 is further arranged for using the anatomical information 122 to identify an anatomical landmark which has an anatomical relation with the lesion. For that purpose, the image analyzer 140 is shown to access the anatomical information 122 via the database interface 120. The image analyzer 140 is further arranged for detecting the anatomical landmark in the medical image 112. The system 100 further comprises a key-image generator 160 arranged for selecting an image area 400 in the medical image 112 which comprises the lesion and the anatomical landmark. For that purpose, the key-image generator 160 is shown to receive data 142 indicative of the lesion and the anatomical landmark from the image analyzer 140, e.g., in the form of coordinates. The key-image generator 160 is further arranged for generating the key-image 162 so as to comprise said image area. For example, the key-image generator 160 may crop the medical image 112 so as to obtain a key-image 162 which consists of the image area. FIG. 1 further shows the key-image generator 160 receiving the medical image 112 via the image analyzer 140. It is noted, however, that the medical image 112 may also be received directly from the image interface 110.

FIG. 1 shows the key-image generator 160 making the key-image 162 available, e.g., for display on a display 040 and/or storage on the image database 010. However, other forms of making available the key-image 162 are also conceivable.

FIG. 1 further shows the system 100 comprising a user interface subsystem 130. This optional aspect of the invention will be further explained in reference to FIGS. 4c and 6. Similarly, FIG. 1 shows the database interface 120 obtaining a textbook view 124 and the key-image generator 160 generating a further key-image 164 based on the textbook view 124. This optional aspect of the invention will be further explained in reference to FIG. 6. An operation of the system 100 may be briefly explained as follows. The image interface 110 obtains the medical image 112 and the metadata. The database interface 120 accesses the medical database 020 so as to access the anatomical information 122. The image analyzer 140 detects a lesion in the medical image 112. Having detected the lesion, the image analyzer 140 uses the anatomical information to identify an anatomical landmark which has an anatomical relation with the lesion. Moreover, the image analyzer 140 detects the anatomical landmark in the medical image 112. Having obtained data indicative of the lesion and the anatomical landmark, the key-image generator 160 selects an image area in the medical image which comprises the lesion and the anatomical landmark. Finally, the key-image generator 160 generates the key-image 162 so as to comprise said image area.

It is noted that the image analyzer 140 may identify the anatomical landmark in the anatomical information 122 before detecting the anatomical landmark in the medical image 112. However, this is not a limitation, in that the image analyzer 140 may also first detect the anatomical landmark in the medical image 112, and only then identify the anatomical landmark in the anatomical information 122. For example, the image analyzer 140 may detect a plurality of anatomical landmarks in the medical image 112, e.g., by simultaneously applying a plurality of anatomical landmark detectors to the medical image 112. The image analyzer 140 may then select one or more of the plurality of anatomical landmarks for inclusion in the key-image 162 based on identifying the plurality of anatomical landmarks in the anatomical information 122. For example, the image analyzer 140 may select one or more of the most relevant ones of the plurality of anatomical landmarks.

FIG. 2 shows a method 200 for generating a key-image from a medical image, the key-image comprising an image area selected from the medical image. The method 200 comprises, in a step titled "OBTAINING MEDICAL IMAGE", obtaining 210 the medical image and metadata indicative of a content of the medical image. The method 200 further comprises, in a step titled "ACCESSING ANATOMICAL INFORMATION", accessing 220 anatomical information on a medical database, the anatomical information being indicative of anatomical landmarks associated with the content of the medical image. The method 200 further comprises, in a step titled "DETECTING LESION IN MEDICAL IMAGE", detecting 230 a lesion in the medical image. The method 200 further comprises, in a step titled "IDENTIFYING ANATOMICAL LANDMARK IN ANATOMICAL INFORMATION", based on the anatomical information, identifying 240 an anatomical landmark which has an anatomical relation with the lesion. The method 200 further comprises, in a step titled "DETECTING ANATOMICAL LANDMARK IN MEDICAL IMAGE", detecting 250 the anatomical landmark in the medical image. The method 200 further comprises, in a step titled "SELECTING IMAGE AREA", selecting 260 an image area in the medical image which comprises the lesion and the anatomical landmark. The method 200 further comprises, in a step titled "GENERATING KEY-IMAGE COMPRISING IMAGE AREA", generating 270 the key-image so as to comprise said image area. It is noted that the above steps may be performed in any suitable order. In particular, the steps of identifying 240 and detecting 250 the anatomical landmark may be performed in a different order, e.g., in a reverse order.

The method 200 may correspond to an operation of the system 100. However, the method 200 may also be performed in separation of the system 100.

FIG. 3 shows a computer program product 290 comprising instructions for causing a processor system to perform the aforementioned method 200. The computer program product 290 may be comprised on a computer readable medium 280, for example in the form of as a series of machine readable physical marks and/or as a series of elements having different electrical, e.g., magnetic, or optical properties or values.

The operation of the system 100 may be explained in more detail as follows.

FIG. 4a schematically shows a medical image 112. The medical image 112 is shown to comprise a lesion 300 which is schematically indicated in FIG. 4a as a triangle. FIG. 4a further shows an anatomical landmark 310 being located nearby the lesion 300, with the anatomical landmark 310 being schematically indicated in FIG. 4a as an ellipse. Moreover, both of the lesion 300 and the anatomical landmark 310 are comprised in an anatomical structure 320. FIG. 4a may correspond to, e.g., a tumor 300 growing in a liver 320, with the tumor 300 growing nearby a duct 310 forming the anatomical landmark 310. The image analyzer 140 is arranged for detecting the lesion 300 in the medical image 112, e.g., automatically using an lesion detection technique as is known per se from the field of medical image analysis, or semi-automatically, i.e., in part based on user input.

Figure 4B:
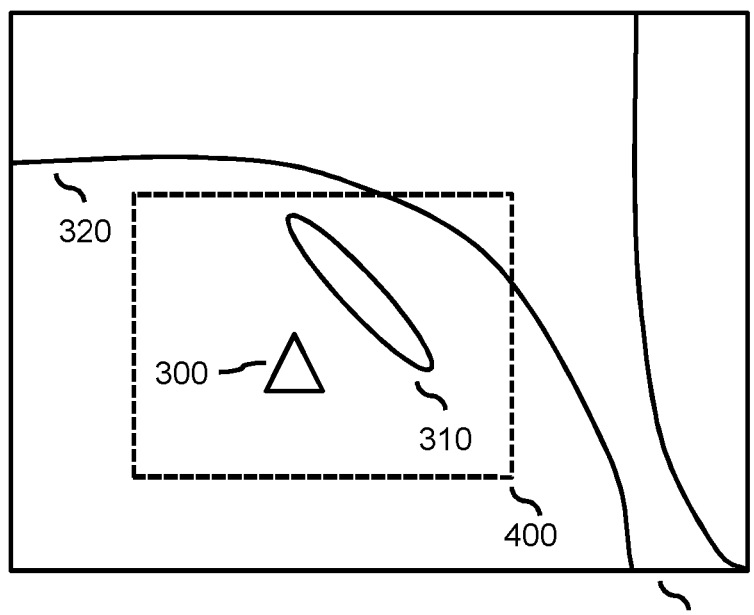
FIG. 4b shows an image area being selected automatically, the image area comprising the lesion and the anatomical landmark.

FIG. 4b show a result of an image area 400 being selected automatically which comprises the lesion 300 and the anatomical landmark 310. FIG. 4b shows the image area being selected by a bounding box 400. For that purpose, the key-image generator 160 may be arranged for establishing a bounding box 400 in the medical image 112 which encompasses the lesion 300 and the anatomical landmark 310. Alternatively, the image area 400 may be selected to have another, e.g., non-rectangular shape. FIG. 4b shows the bounding box 400 being established as surrounding the lesion 300 and the anatomical landmark 310 with a margin. The margin may be automatically selected by the key-image generator 162. For example, the key-image generator 160 may be arranged for minimizing the margin. Alternatively or additionally, the margin may be selectable or adjustable by the user, e.g., by making use of the user interface subsystem 130 to select or adjust the margin.

FIG. 4b shows a result of the image analyzer 140 determining which anatomical landmark to include in the key-image based on the anatomical relation between the lesion 300 and said anatomical landmark. The anatomical relation may be indicated or comprised in the anatomical information 122 itself. Alternatively or additionally, the anatomical relation may be estimated based on an estimated distance to the lesion 300. For example, an anatomical landmark being located nearby the lesion 300 may indicate an anatomical relation existing with the lesion 300. In the example of FIG. 4b, a duct 310 is shown as well as an edge of the liver 320. Both anatomical landmarks may be identified in the anatomical information 022. The image analyzer 140 may then choose to detect the duct 310 in the medical image 112 based on the duct 310 being nearby the lesion 300.

Alternatively or additionally, the image analyzer 140 may be arranged for, if the lesion 300 is comprised in an anatomical structure 320, detecting said anatomical structure 320 in the medical image 112 and identifying the anatomical landmark from the anatomical structure 320. As such, the image analyzer 140 may determine that the lesion 300 is comprised in the liver 320. The image analyzer 140 may further identify an anatomical landmark of the liver 320, e.g., its edge. As a result, a key-image 162 may be obtained which shows the lesion 300 and at least a part of the edge of the anatomical structure 320. It is noted that image analyzer 140 may also detect the edge so as to be able to detect an anatomical landmark which has a known position relative to the edge of the anatomical structure.

Additionally or alternatively, the image analyzer 140 may be arranged for identifying the anatomical landmark 310 based on an estimated relevance of the anatomical relation in the medical interpretation of the lesion 300. In the example of FIG. 4b, the content of the medical image 112 is a liver. This may be indicated in the metadata of the medical image 112. As such, the database interface 120 may access a medical database 020 which comprises anatomical information 122 on the liver. The anatomical information 122 may enable medical interpretation of the content of the medical image 112. For example, the database interface 120 may access a medical textbook on the liver which allows a clinician to medically interpret the content of the medical image 112, e.g., by showing a textbook view of the liver, identifying relevant anatomical landmarks, providing guidelines for the diagnosis, etc. The image analyzer 140 may then identify an anatomical landmark 310 which not only has an anatomical relation with the lesion 300, but which is also of relevance in the medical interpretation of the lesion 300. For example, the image analyzer 140 may use a position of the lesion 300 in the medical image 112 to identify a nearby anatomical landmark 310 in the textbook view of the liver. The fact that the nearby anatomical landmark 310 is clearly identified in the textbook view of the liver may indicate to the image analyzer 140 that the anatomical relation between the lesion 300 and the anatomical landmark 310 is of relevance in the medical interpretation of the lesion 300. It will be appreciated, however, that various other ways may be advantageously used by the image analyzer 140 to determine said relevance; for example, the image analyzer 140 may employ techniques as are known per se from reasoning engines to estimate the relevance of the anatomical relation.

FIG. 4b further shows a result of the key-image generator 160 selecting an image area 400 which comprises the lesion 300 and the anatomical landmark 310. The image area 400 is shown in the form of a bounding box overlaid over the medical image 112. Although not shown in FIG. 4b, it is noted that the image analyzer 140 may also use the anatomical information to identify multiple anatomical landmarks which each have an anatomical relation with the lesion. Consequently, the key-image generator 160 may select an image area 400 which comprises the lesion and each of the multiple anatomical landmarks.

Figure 4C:
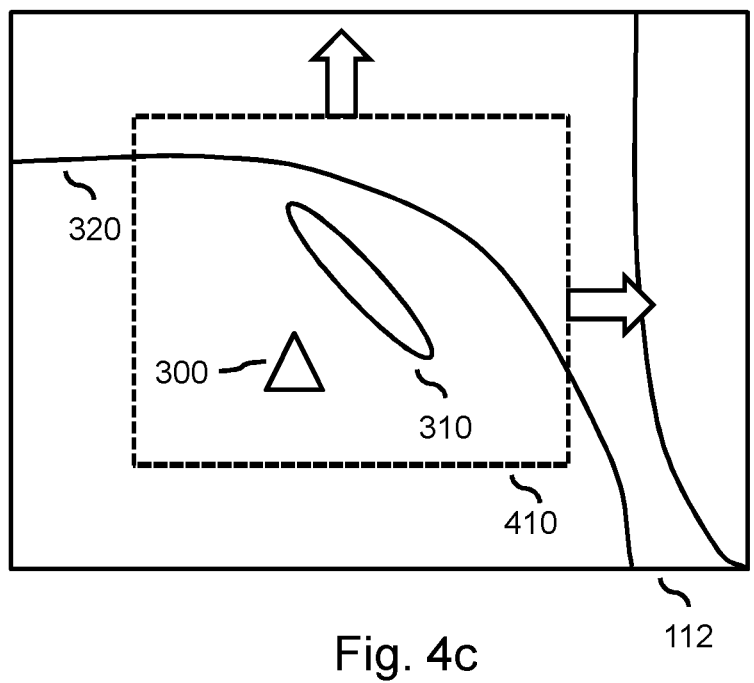
FIG. 4c shows a result of a user adjusting the selected area.

FIG. 4c shows an optional aspect of the present invention in that it shows a result of the user manually adjusting the selected area. For that purpose, and as shown earlier in FIG. 1, the system 100 may comprise a user interface subsystem 130 for enabling the user to adjust the image area 400 before the key-image 162 is generated. The user interface subsystem 130 may be constituted by, e.g., a display output connectable to a display for displaying output to the user, and a user input connectable to a user input device for receiving input 030 from the user. For example, the user may be shown the image area 400 as selected by the system 100, e.g., in the form of the bounding box overlaid over the medical image 112. The user may then adjust the bounding box 400, e.g., by moving and/or resizing the bounding box 400. FIG. 4c shows a result of such adjustment, where the user has adjusted the bounding box 400 selected by the system 100 by increasing a size of the bounding box 400 so as to include a larger part of the edge of the liver 320, i.e., by increasing the size of the bounding box 400 upwards and rightwards. The resizing is illustratively shown in FIG. 4c by means of arrows. As a result, an adjusted bounding box 410 is obtained.

Figure 4D:
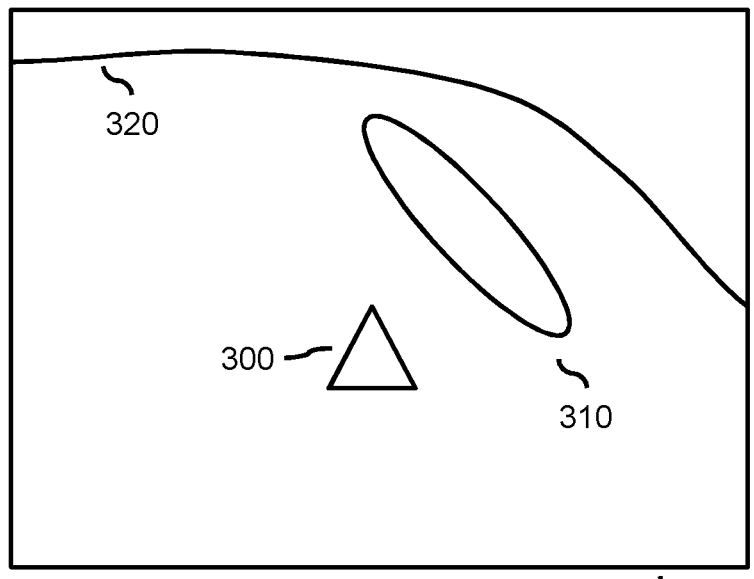
FIG. 4d shows a key-image generated to comprise the selected area.

Although not shown in FIG. 4c, the interaction with the user may be such that the bounding box automatically snaps to the anatomical landmark in the medical image. The anatomical landmark may be highlighted in the medical image to assist or inform the user. Having automatically selected the image area 400, and optionally manually adjusted the image area 400, the key-image generator 160 may generate the key-image 162 so as to comprise the image area 400, 410. FIG. 4d shows an example of this. Here, the key-image 162 is shown to consist of the image area 400, 410. For that purpose, the medical image 112 may be cropped so as to obtain the key-image 162. Alternatively, the image area 400, 410 may be copied or extracted from the medical image 112. Although not shown in FIG. 4d, the key-image 162 may additionally comprise other information, such as annotations, markers, etc. Hence, it is noted needed for the key-image 162 to consist solely of the image area 400, 410. Moreover, although not shown in FIG. 4d, the key-image generator 160 may be arranged for adjusting a window level and/or window width of the key-image 162, i.e., in an automatic manner. It is noted that techniques for automatically adjusting the window level and/or window width are known per se from the field of medical image display, and may be advantageously used to optimize the presentation of the key-image 162.

It will be appreciated that the key-image may be generated explicitly, e.g., by being comprised of pixels or voxels. The key-image may also be constituted by metadata. The metadata may provide viewing parameters which, when used in an appropriate image viewer, establish the key-image on screen. For that purpose, the image viewer may access the medical image itself. The medical image may be referenced in the metadata. In general, the key-image generator may thus be arranged for generating the key-image data for enabling establishing a key-image which comprises the selected image area of the medical image.

Figure 5A:
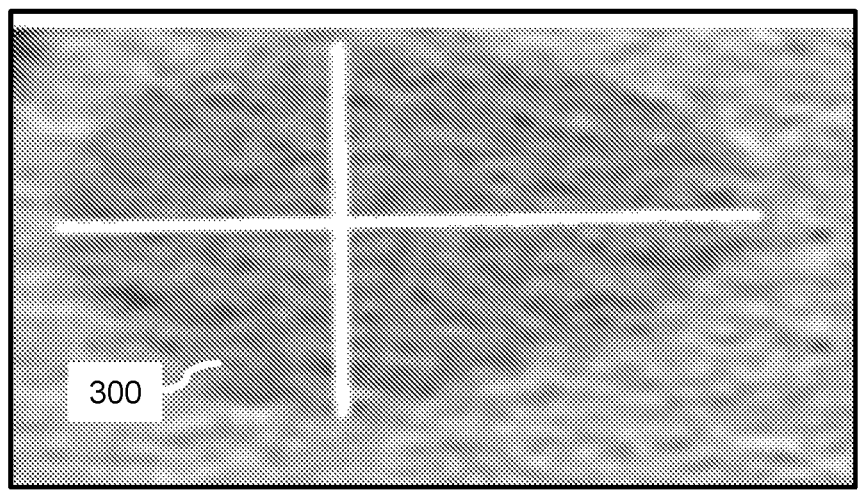
FIG. 5a shows a key-image comprising solely the lesion.
Figure 5B:
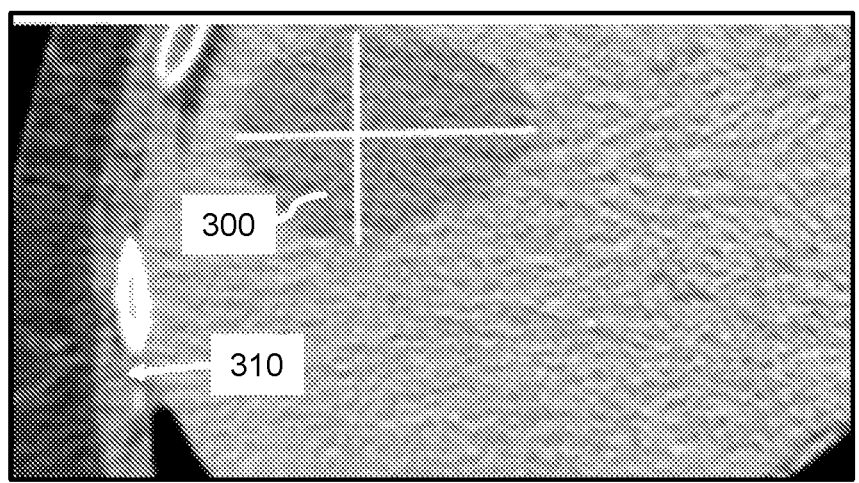
FIG. 5b shows a key-image according to the present invention.

FIG. 5a shows an example of a key-image 166 essentially showing only a lesion 300. Disadvantageously, such a key-image 166 may be obtained when selecting an image area 400 which essentially consists solely of the lesion 300. Such an image area 400 may be implicitly selected when cropping the medical image to show only the lesion 300. FIG. 5b shows a key-image 162 according to the present invention. It can be seen that the key-image 162 shows an anatomical landmark 310 in addition to the lesion itself.

It will be appreciated that the present invention may be advantageously used for various types of medical images, i.e., for various different content. For example, in case of a liver image, a liver lesion shown in isolation is less informative than a liver lesion with the outline of the liver contour. Part of the liver contour already reveals a large amount of information, such as the location of the lesion within the liver, involvement of other structures and relative size with respect to the full organ. Another example is mammography. Here, a key-image of a mammography lesion which also shows part of the skin contour is more informative than showing the mammography lesion only. A small part of the skin is already sufficient to reveal information such as for example the relative location of the lesion in the breast, and if the breast shown in the key-image is the right or left breast.

Although not shown in any of the previous figures, the key-image generator 160 may be arranged for maintaining an aspect ratio of the bounding box 400 over a number of medical images. For example, the key-image generator 160 may always use a same aspect ratio for a particular type of medical image, a particular type of patient, etc. The key-image generator 160 may derive the aspect ratio from a key-image from a previous exam of the patient, and then maintain said aspect ratio for the key-image of the current exam. The key-image generator 160 may also maintain said aspect ratio during manual adjustment by the user. Hence, the aspect ratio may be 'locked', i.e., not be adjustable by the user.

An advantageous embodiment of the present invention may be the following. The lesion is detected in the medical image, and a first bounding box is established around the lesion so as to mark the lesion. The anatomical structure in which the lesion invades is detected. Anatomical landmarks belonging to the anatomical structure are automatically detected. For that purpose, the anatomical information may be used, i.e., to identify said anatomical landmarks. Bounding boxes are then established around each of the detected anatomical landmarks. Finally, the key-image is generated such that it shows at least all the aforementioned bounding boxes. Optionally, the window width/level of the key-image is adjusted so as to obtain an optimal presentation of the key-image to the user.

Figure 6:
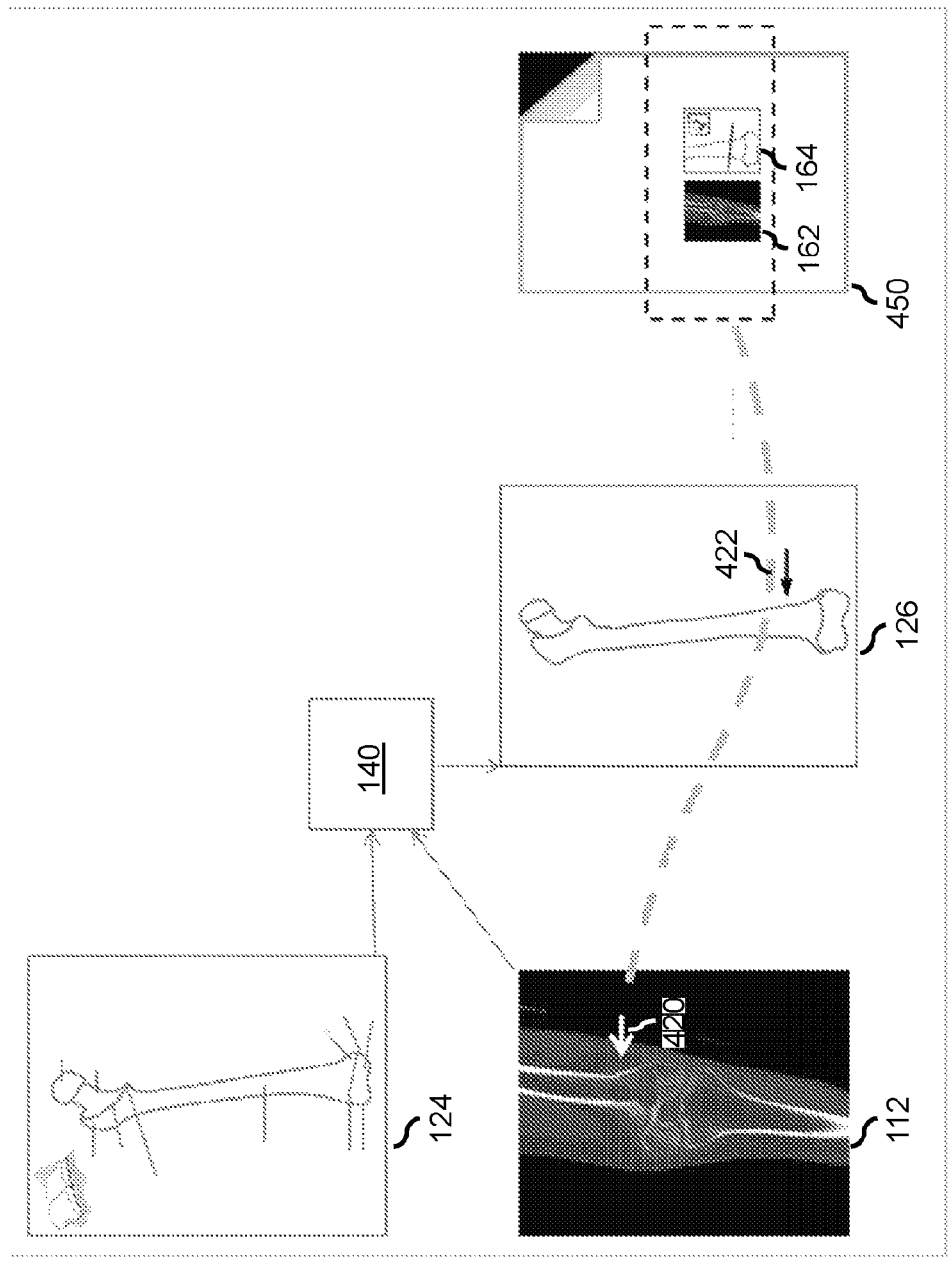
FIG. 6 shows a further key-image being generated from a textbook view of the content of the medical image and being included in a report together with the key-image.

FIG. 6 shows an optional aspect of the present invention in that a further key-image is generated from a textbook view 124 of the content of the medical image. For that purpose, the medical database may comprise a textbook view 124 of the content of the medical image, and the system 100 may be arranged for generating a further key-image 164 from the textbook view which comprises the anatomical landmark 310 and a location corresponding to the lesion 310. In the example of FIG. 6, the medical image 112 shows a fracture, i.e., a type of lesion, in a bone. The textbook view 124 may show the bone in a non-patient specific manner. The textbook view 124 may show the bone in a schematic manner, e.g., as a line drawing. The textbook view 124 may identify anatomical landmarks, such as a body of the bone, its head and its neck. Additionally or alternatively, said anatomical landmarks may be included as anatomical information in the medical database, i.e., in separation of the textbook view 124. The image processor 140 may be arranged for determining a location in the textbook view 124 which corresponds to that of the location of the lesion in the medical image 112. Moreover, the image processor 140 may identify the anatomical landmark, as detected in the medical image 112, also in the textbook view 124. As such, the key-image generator 162 may generate a further key-image 164 from the textbook view 124 which comprises the location of the lesion and the anatomical landmark.

The system 100 may further comprise annotation means for enabling a user to include an annotation 420 in the key-image 162. The annotation means may be constituted by the user interface subsystem 130. As such, the user may, e.g., draw an annotation using a user input device connected to the user interface subsystem 130. As is shown in FIG. 6, the user may include the annotation 420 in the medical image 112. The annotation 420 may then be automatically included in the key-image 162 provided that the annotation 420 is included by the user in the image area 400 selected by the key-image generator 160. This may typically be the case as such annotations are likely to relate to the lesion 300. The system may be further arranged for including the annotation at a corresponding location in the further key-image 164. For illustration purposes, FIG. 6 shows the annotation 422 being firstly included in an intermediate textbook image 126 as generated from the textbook view 124. It is noted that it is not needed to explicitly generate such an intermediate textbook image 126. Rather, the further key-image 164 may be generated directly from the textbook view 124 and the annotation 422 may be included directly in the further key-image 164.

The system 100 may be further arranged for registering the textbook view 124 towards the medical image 112 before generating the further key-image 164. FIG. 6 shows a result of this in the form of the intermediate textbook image 126 which is shown to be slightly deformed to better match the bone depicted in the medical image 112. The textbook view 124 may also be associated with an anatomical model. Here, the registering may be based on a model fitting of the anatomical model to the medical image 112.

FIG. 6 further shows the key-image 162 and the further key-image 164 being included in a report 450. However, various other advantageous uses exist, such as including the key-image 162 and the further key-image 164 in an electronic message such as an E-mail.

It is noted that aspects of the present invention as explained in reference to FIG. 6 and which relate to the textbook view may also be used in separation of the key-image and/or the further key-image. For that purpose, an annotation system may be provided which comprises an image interface for obtaining a medical image and metadata indicative of a content of the medical image. The annotation system may further comprise a database interface for accessing a medical database, comprising a textbook view of the content of the medical image. The annotation system may further comprise an image processor for generating a textbook image of the textbook view for simultaneous presentation with the medical image. The annotation system may further comprise an annotation means for enabling a user to include an annotation in the medical image. The image processor may be arranged for including the annotation at a corresponding location in the textbook image. Hence, compared to the system of FIG. 1, such an annotation system may not need to comprise the key-image generator and the image analyzer. Moreover, the medical database accessed by such an annotation system may not need to comprise the anatomical information.

It will be appreciated that the textbook view, as discussed in reference to the aforementioned system and the annotation system, may be processed so as to obtain a textbook image or a further key-image in the following manner. An organ or body part may be detected in the medical image, e.g., based on a position of a mouse cursor. A textbook view of the organ or body part may be accessed on the medical database. The textbook view may be associated with a model of the organ or body part. The model may be fitted to the organ or body part depicted in the medical image. A schematic view may be created of the outline of the fitted model. For clarity, the schematic view of the organ or body part may be shown overlaid over the actual organ or body part in the medical image. Additionally or alternatively, the schematic view may be included in a separate textbook image. If no organ or body part could be detected, a schematic view of local edges in the medical data which enclose the position of the mouse cursor may be used instead. The schematic view and the medical image may be linked, in that an annotation included in the medical image may be automatically included at a corresponding position in the schematic view.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for generating a key-image from a medical image, the key-image comprising an image area selected from the medical image, the system comprising:
   an image interface for obtaining the medical image and metadata indicative of a content of the medical image;
   a database interface for accessing anatomical information on a medical database, the anatomical information being indicative of anatomical landmarks associated with the content of the medical image;
   an image analyzer for:
   i) detecting a position of a lesion in the medical image;
   ii) based on the anatomical information, identifying a plurality of anatomical landmarks which have anatomical relations with the lesion;
   iii) detecting the plurality of anatomical landmarks in the medical image; and
   iv) determining a nearest anatomical landmark of the plurality of anatomical landmarks, wherein determining the nearest anatomical landmark comprises two or more of:
   a) determining a plurality of distances between the lesion and individual ones of the plurality of anatomical landmarks, and identifying the nearest anatomical landmark based on a closest distance between the lesion and an individual one of the plurality of anatomical landmarks;
   b) determining an anatomical structure that includes the lesion and identifying the nearest anatomical landmark based on the anatomical structure; and
   c) identifying the nearest anatomical landmark based on an estimated relevance of the anatomical relations of the plurality of anatomical landmarks to the lesion in a medical interpretation of the lesion; and
   a key-image generator for:
   j) selecting an image area in the medical image which comprises the lesion and the nearest anatomical landmark of the plurality of anatomical landmarks, and
   jj) generating the key-image by cropping or extracting the selected image area from the medical image.

2. The system according to claim 1, wherein the image analyzer is arranged for:

detecting the anatomical structure in the medical image and identifying the nearest anatomical landmark based on the anatomical structure;
and one or both of
a) determining the plurality of distances between the lesion and the individual ones of the plurality of anatomical landmarks, and identifying the nearest anatomical landmark based on the closest distance between the lesion and the individual one of the plurality of anatomical landmarks; and
c) identifying the nearest anatomical landmark based on the estimated relevance of the anatomical relations of the anatomical landmarks to the lesion in the medical interpretation of the lesion.

3. The system according to claim 2, wherein the nearest anatomical landmark and an edge of the anatomical structure are included in the image area.

4. The system according to claim 1, wherein the anatomical information enables the medical interpretation of the lesion, and wherein the image analyzer is arranged for identifying the nearest anatomical landmark based on the estimated relevance of the anatomical relations of the individual landmarks to the lesion in the medical interpretation of the lesion and one or both of:
a) determining a plurality of distances between the lesion and individual ones of the plurality of anatomical landmarks, and identifying the nearest anatomical landmark based on the closest distance between the lesion and the individual one of the plurality of anatomical landmarks; and
b) determining an anatomical structure that includes the lesion and identifying the nearest anatomical landmark based on the anatomical structure.

5. The system according to claim 1, wherein the image analyzer is arranged for identifying the anatomical landmark based on the distances from individual ones of the plurality of anatomical landmarks to the position of the lesion and one or both of:
b) determining the anatomical structure that includes the lesion and identifying the nearest anatomical landmark based on the anatomical structure; and
c) identifying the nearest anatomical landmark based on the estimated relevance of the anatomical relations of the plurality of anatomical landmarks to the lesion in the medical interpretation of the lesion.

6. The system according to claim 1, further comprising a user interface subsystem for enabling a user to adjust the image area before the key-image is generated.

7. The system according to claim 1, wherein the key-image generator is arranged for selecting the image area by establishing a bounding box in the medical image which encompasses the lesion and the nearest anatomical landmark.

8. The system according to claim 7, wherein the key-image generator is arranged for maintaining an aspect ratio of the bounding box over a number of medical images.

9. The system according to claim 1, wherein the key-image generator is arranged for adjusting a window level and a window width of the key-image.

10. The system according to claim 1, wherein the medical database comprises a textbook view of the content of the medical image, and wherein the system is arranged for generating a further key-image from the textbook view which comprises the nearest anatomical landmark and the position of the lesion.

11. The system according to claim 10, further comprising annotation means for enabling a user to include an annotation in the key-image, and wherein the system is arranged for including the annotation at a corresponding location in the further key-image.

12. The system according to claim 11, further arranged for registering the textbook view towards the medical image before generating the further key-image.

13. Workstation or imaging apparatus comprising the system of claim 1.

14. Method for generating a key-image from a medical image, the key-image comprising an image area selected from the medical image, the method comprising:
obtaining the medical image and metadata indicative of a content of the medical image;
accessing anatomical information on a medical database, the anatomical information being indicative of anatomical landmarks associated with the content of the medical image;
detecting a position of a lesion in the medical image;
based on the anatomical information, identifying a plurality of anatomical landmarks which have anatomical relations with the lesion;
detecting the plurality of anatomical landmarks in the medical image;
determining a nearest anatomical landmark of the plurality of anatomical landmarks, wherein determining the nearest anatomical landmark comprises two or more of:
a) determining a plurality of distances between the lesion and individual ones of the plurality of anatomical landmarks, and identifying the nearest anatomical landmark based on a closest distance between the lesion and an individual one of the plurality of anatomical landmarks;
b) determining an anatomical structure that includes the lesion and identifying the nearest anatomical landmark based on the anatomical structure; and
c) identifying the nearest anatomical landmark based on an estimated relevance of the anatomical relations of the plurality of anatomical landmarks to the lesion in a medical interpretation of the lesion; and
selecting an image area in the medical image which comprises the lesion and the nearest anatomical landmark of the plurality of anatomical landmarks; and
generating the key-image by cropping or extracting the selected image area from the medical image.

15. A computer program product stored on a non-transitory computer-readable medium comprising instructions for causing a processor system to perform the method according to claim 14.

* * * * *